US012374823B2

(12) United States Patent
Yang et al.

(10) Patent No.: US 12,374,823 B2
(45) **Date of Patent: *Jul. 29, 2025**

(54) WATERPROOF ELECTRICAL CONNECTION DEVICE

(71) Applicant: JESS-LINK PRODUCTS CO., LTD., New Taipei (TW)

(72) Inventors: Yun-Chang Yang, New Taipei (TW); Ming-Wei Chen, New Taipei (TW); Ming-Jun Xu, New Taipei (TW); Wen-Fu Liao, New Taipei (TW)

(73) Assignee: JESS-LINK PRODUCTS CO., LTD., New Taipei (TW)

( * ) Notice: Subject to any disclaimer, the term of this patent is extended or adjusted under 35 U.S.C. 154(b) by 321 days.

This patent is subject to a terminal disclaimer.

(21) Appl. No.: 18/203,622

(22) Filed: May 30, 2023

(65) Prior Publication Data

US 2024/0332853 A1 Oct. 3, 2024

(30) Foreign Application Priority Data

Mar. 30, 2023 (TW) ................................ 112112289

(51) Int. Cl.
*H01R 13/52* (2006.01)
*H01R 4/02* (2006.01)

(52) U.S. Cl.
CPC ............ *H01R 13/52* (2013.01); *H01R 4/023* (2013.01)

(58) Field of Classification Search
CPC ........ H01R 13/52; H01R 13/46; H01R 4/023; H01R 4/00; H01R 3/00
See application file for complete search history.

(56) References Cited

U.S. PATENT DOCUMENTS 6,577,656 B2 * 6/2003 Chen ..................... H01S 5/0238 372/36
6,616,480 B2 * 9/2003 Kameyama .......... H01R 13/521 439/271

(Continued)

FOREIGN PATENT DOCUMENTS

TW M629607 U 7/2022
TW M643065 U 6/2023

OTHER PUBLICATIONS

Office Action dated Nov. 23, 2023 of the corresponding Taiwan patent application No. 112112289.

*Primary Examiner* — Harshad C Patel
(74) *Attorney, Agent, or Firm* — Chun-Ming Shih; HDLS IPR SERVICES

(57) ABSTRACT

A waterproof electrical connection device includes a waterproof casing, a socket assembly, a wire element, and a waterproof plug. The waterproof casing includes a wiring port. An inner surface of the waterproof casing includes an annular step surface facing the wiring port. The wiring port is covered by an end cover. The socket assembly is placed inside the waterproof casing. The waterproof plug is arranged in the wiring port to seal it. The wire element is connected to a connector of the socket assembly and passes through the waterproof casing via the waterproof plug. The waterproof plug has an inner end and an outer end opposite to the inner end. The inner end is arranged toward the socket assembly and includes a longitudinal ring rib. The end cover is fastened to the waterproof casing to press the outer end, so that the longitudinal ring rib presses the annular step surface.

10 Claims, 11 Drawing Sheets

(56) References Cited

U.S. PATENT DOCUMENTS

| | | | | |
|---|---|---|---|---|
| 8,469,742 | B2 * | 6/2013 | Shiga | H01R 13/5208<br>439/587 |
| 9,761,988 | B1 * | 9/2017 | Lin | H01R 13/5216 |
| 10,128,627 | B1 * | 11/2018 | Kazav | G02B 6/4284 |
| 10,627,587 | B2 * | 4/2020 | Wan | G02B 6/4202 |
| 11,820,281 | B2 * | 11/2023 | Massa | F21S 41/28 |
| 12,261,392 | B2 * | 3/2025 | Xu | H01R 13/533 |
| 2013/0171854 | A1 * | 7/2013 | Homme | H01R 13/74<br>439/272 |
| 2015/0148603 | A1 * | 5/2015 | Holste | A61B 1/128<br>600/109 |
| 2015/0285472 | A1 * | 10/2015 | Evitt | F21V 7/0066<br>362/223 |
| 2015/0342836 | A1 * | 12/2015 | Allyn | A61B 1/005<br>600/109 |
| 2016/0233594 | A1 * | 8/2016 | Zhao | H01R 13/6581 |

* cited by examiner

WATERPROOF ELECTRICAL CONNECTION DEVICE

BACKGROUND OF THE INVENTION

Technical Field

The present disclosure relates to an electrical connector, and in particular, to a waterproof electrical connection device for immersion cooling.

Description of Related Art

Fiber optical transceivers are one of the key components of a fiber optical communication system. Fiber optical transceivers can convert electrical signals and optical signals to transmit messages, which results in heat generation during an electro-optical signal conversion process. As the transmission speed of the fiber optical transceiver increases, the generated heat also increases, additional heat dissipation mechanisms, such as fins, on an outer surface of the fiber optical transceiver are being required. With the development of immersion cooling systems with dielectric fluids, the immersion cooling systems can also be used for heat dissipation of fiber optical transceivers. However, there are still issues to be improved in the waterproof and thermal conductivity of the fiber optical transceiver, as it needs to be installed at a boundary between dry and wet spaces to facilitate insertion and removal. Generally, wires are inserted from a wet area into a dry area through a waterproof plug, and then the wires are soldered to a control circuit board of a socket assembly and electrically connected to a connector on the control circuit board for data exchange with the outside. However, the control circuit board is expensive and generally is not designed for immersion cooling systems. Modifying the circuit on the control circuit board for wire soldering requirements is not cost-effective.

In light of the above, the inventor of the present disclosure has devoted himself to doing research and studying scientific principles so as to solve the above problem of conventional techniques.

SUMMARY OF THE INVENTION

The present disclosure provides a waterproof electrical connection device for immersion cooling.

The present disclosure provides a waterproof electrical connection device, including: a waterproof casing, a socket assembly, a wire element, and a waterproof plug. The waterproof casing includes a wiring port, wherein an inner surface of the waterproof casing is provided with an annular step surface facing the wiring port, and an end cover covers the wiring port. The socket assembly is accommodated in the waterproof casing and includes a circuit board and a connector disposed on the circuit board. The wire element is connected to the connector and passes through the waterproof casing via the wiring port. The waterproof plug covers a section of the wire element, wherein the waterproof plug is disposed in the wiring port and seals the wiring port, the waterproof plug includes an inner end and an outer end opposite to the inner end, the inner end is disposed toward the socket assembly and is provided with a longitudinal ring rib, and the waterproof plug covers a connection portion between the wire element and the circuit board. The end cover is fastened to the waterproof casing along a longitudinal direction of the waterproof plug and presses against the outer end, so that the longitudinal ring rib presses against the annular step surface.

According to one embodiment of the present disclosure, the end cover includes a plurality of frame bodies, the frame bodies are connected to each other to define a through hole, and when the frame bodies are assembled, an inner edge of the through hole tightly presses against an outer surface of the waterproof plug. Each of the frame bodies is fastened to the waterproof casing along the longitudinal direction of the waterproof plug.

According one embodiment of the present disclosure, an outer surface of the waterproof plug is provided with a horizontal ring rib, and the horizontal ring rib abuts against the inner surface of the waterproof casing.

According one embodiment of the present disclosure, the wire element includes a plurality of wires, each of the wires includes a wire core and an insulating layer covers the wire core, and in each of the wires, the wire core is exposed from the soldering end and soldered to the corresponding terminal. Each of the terminals includes a soldering groove, each of the soldering grooves includes a notch and a slope, each of the slopes is a concave curved surface, and each of the soldering ends is accommodated in each of the notches and supported by each of the slopes. A diameter of each soldering end is greater than a width of the corresponding notch.

According one embodiment of the present disclosure, each slope is a flat surface, and each soldering end is disposed in a corresponding one of the notches. A diameter of each of the soldering ends is less than a width of the corresponding notch.

According one embodiment of the present disclosure, each of the terminals is an elongated metal sheet.

In the waterproof electrical connection device of the present disclosure, each wire element is connected to the corresponding connector in the socket assembly for data exchange with the outside, and each wire element is electrically connected to the circuit board. Therefore, the circuit board may use the public version, thereby saving materials and production costs.

DETAILED DESCRIPTION

Figure 1:
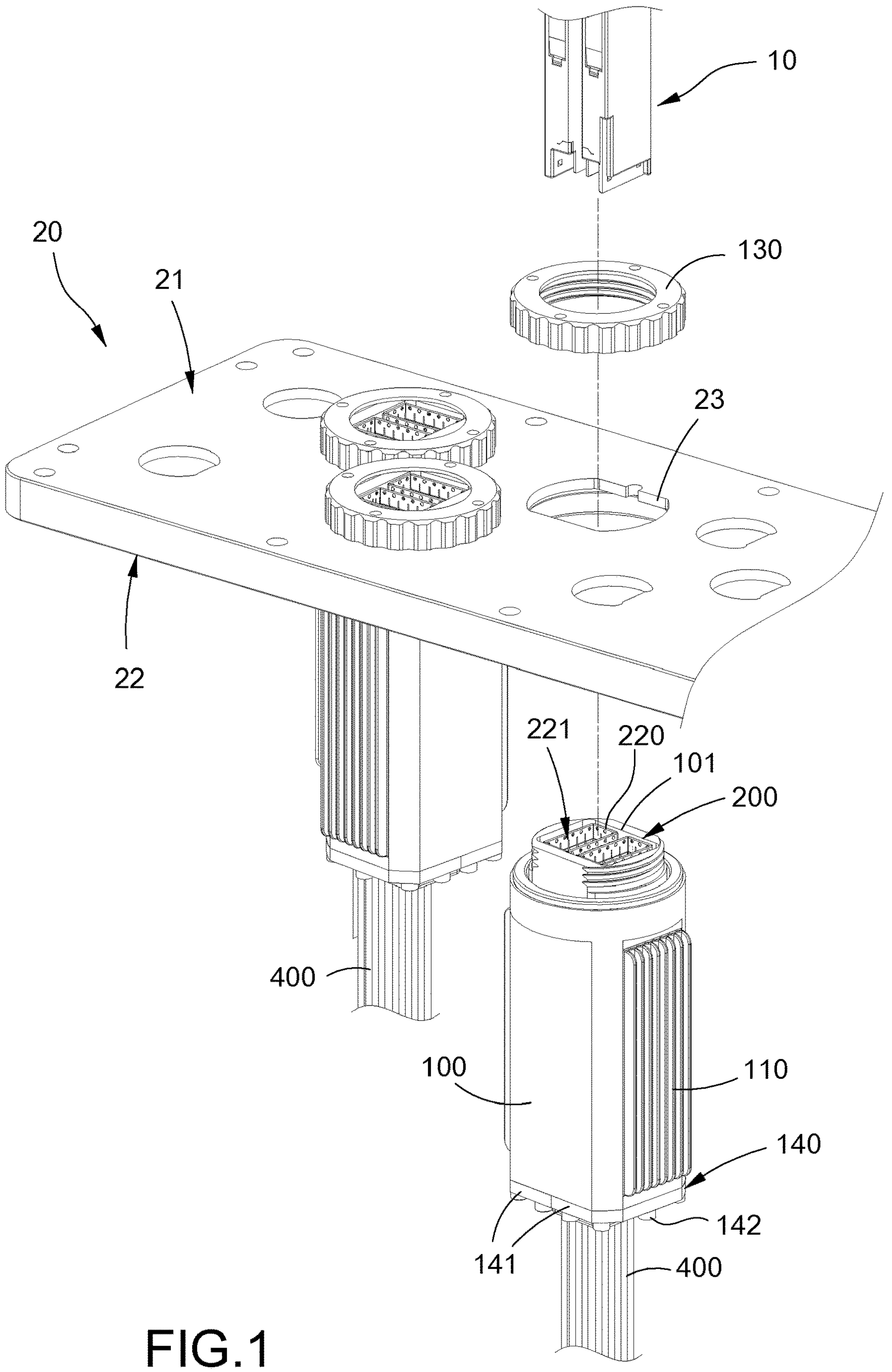
FIGS. 1 and 2 are schematic perspective views of a waterproof electrical connection device according to one embodiment of the present disclosure.
Figure 2:
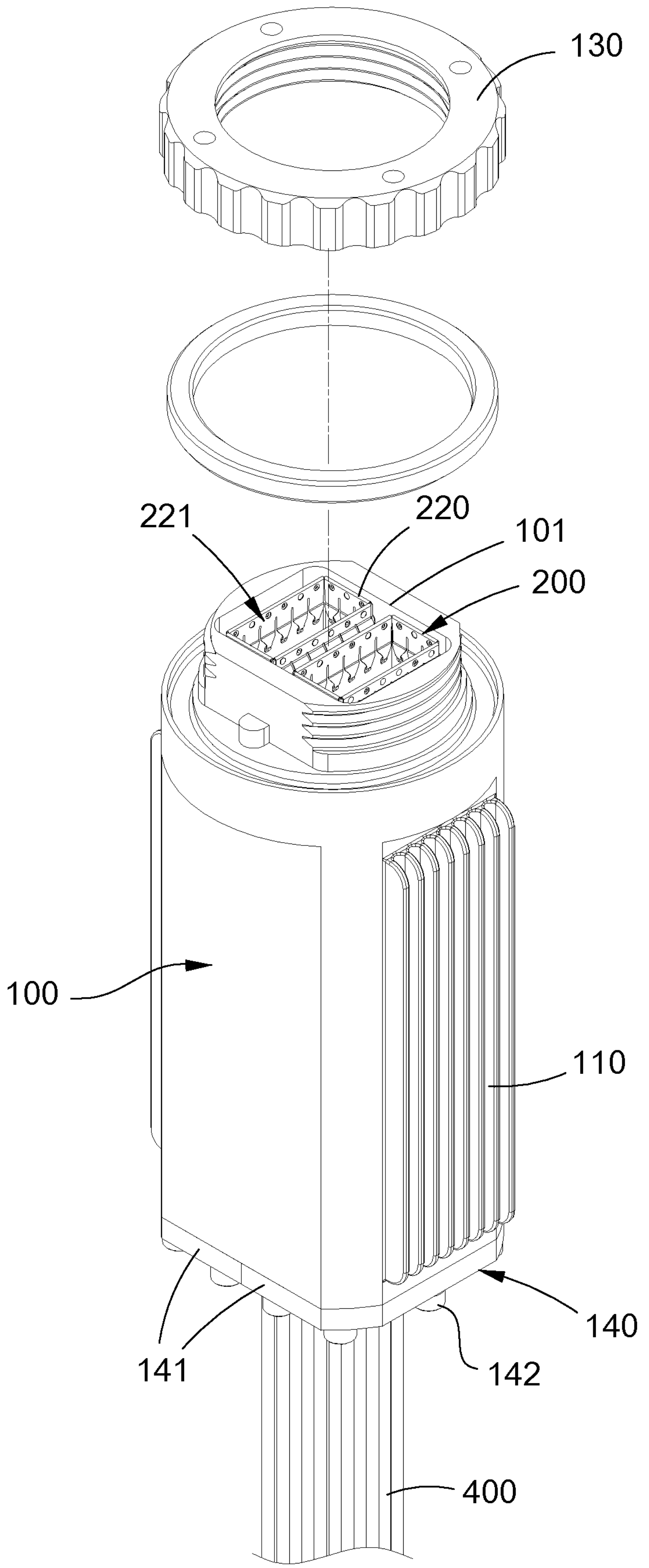

Referring to FIGS. 1 and 2, an embodiment of the present disclosure provides a waterproof electrical connection device for immersion cooling, which is used to be installed on a partition board 20 for inserting a plug 10. Specifically, the partition board 20 is part of a water tank. One side of the partition board 20 is a dry side 21 outside the water tank, and the other side of the partition board 20 is a wet side 22 inside the water tank. An installation hole 23 is defined on the partition board 20, and the installation hole 23 penetrates through the partition board 20.

Figure 3:
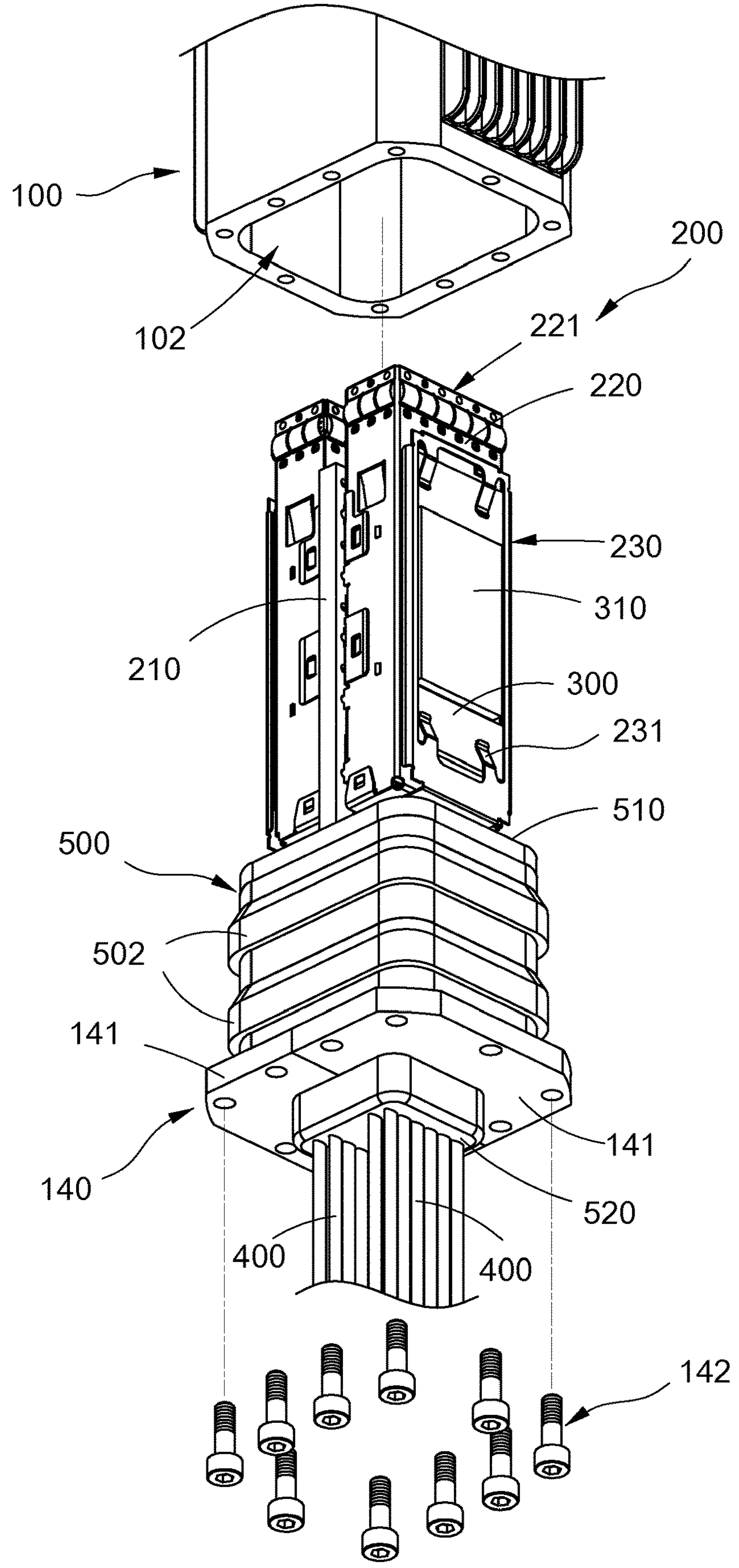
FIGS. 3 and 4 are perspective exploded views of the waterproof electrical connection device according to one embodiment of the present disclosure.
Figure 4:
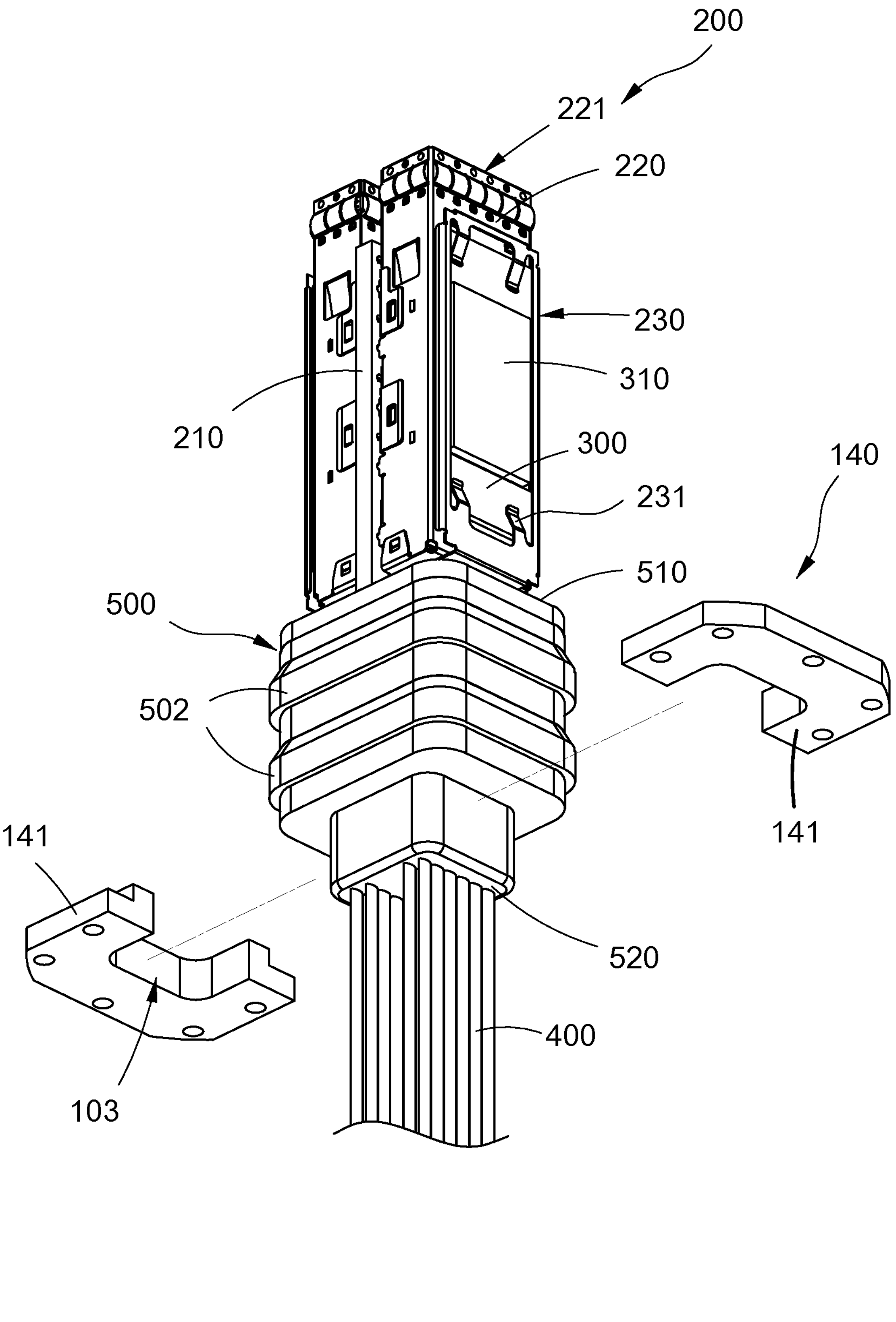
Figure 5:
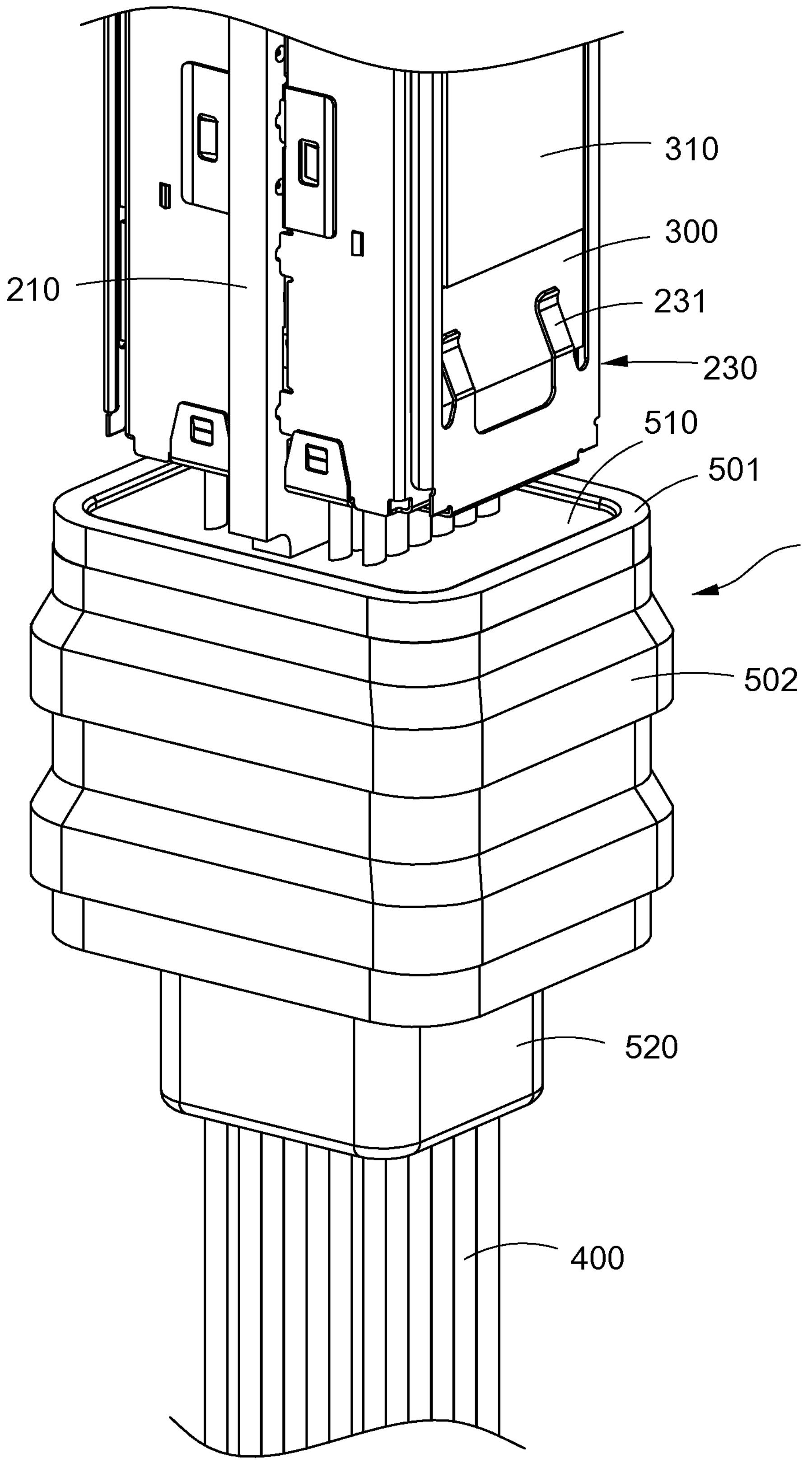
FIG. 5 is a schematic perspective view of a waterproof plug in the waterproof electrical connection device according to one embodiment of the present disclosure.
Figure 6:
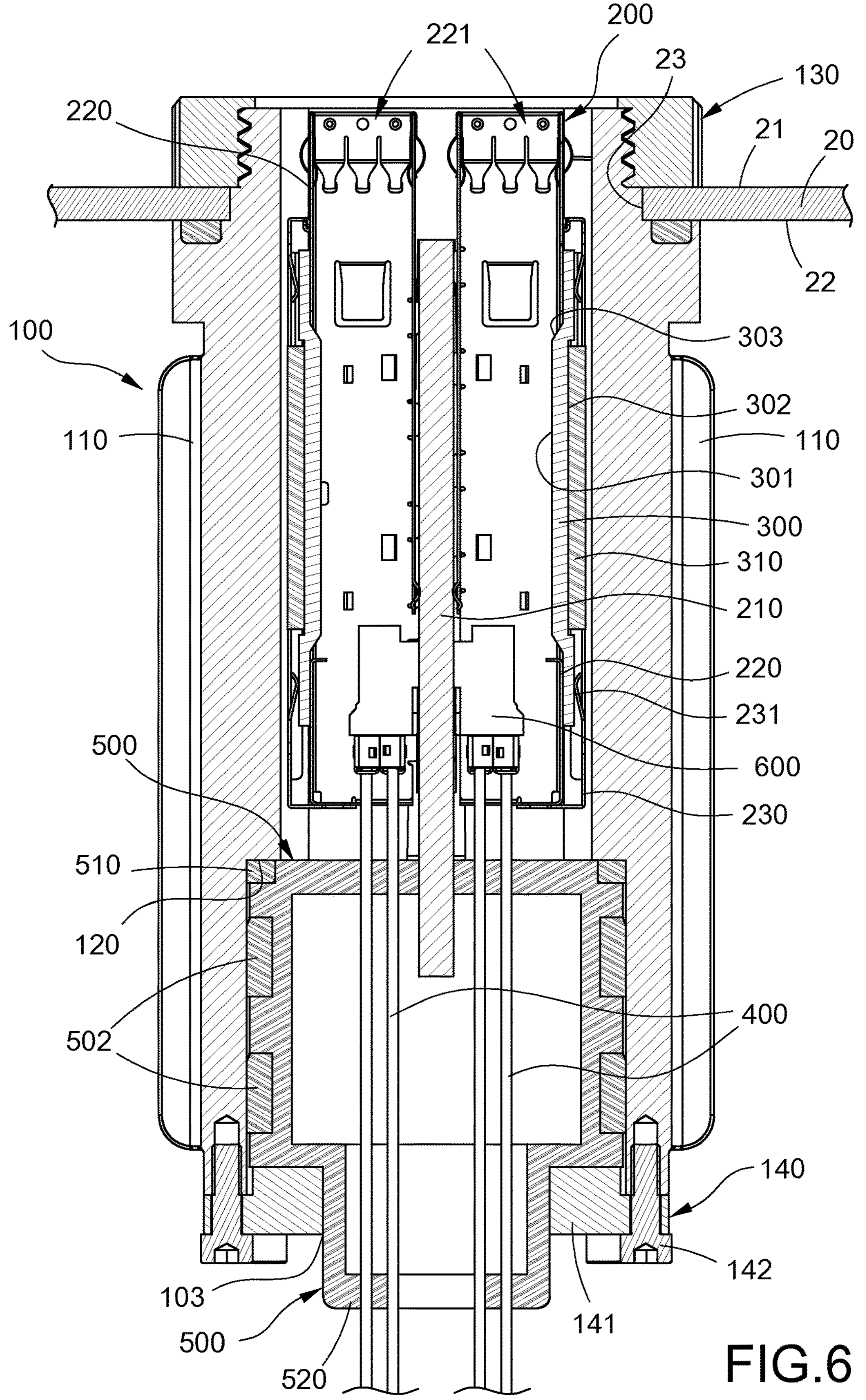
FIG. 6 is a longitudinally cross-sectional view of the waterproof electrical connection device according to one embodiment of the present disclosure.
Figure 7:
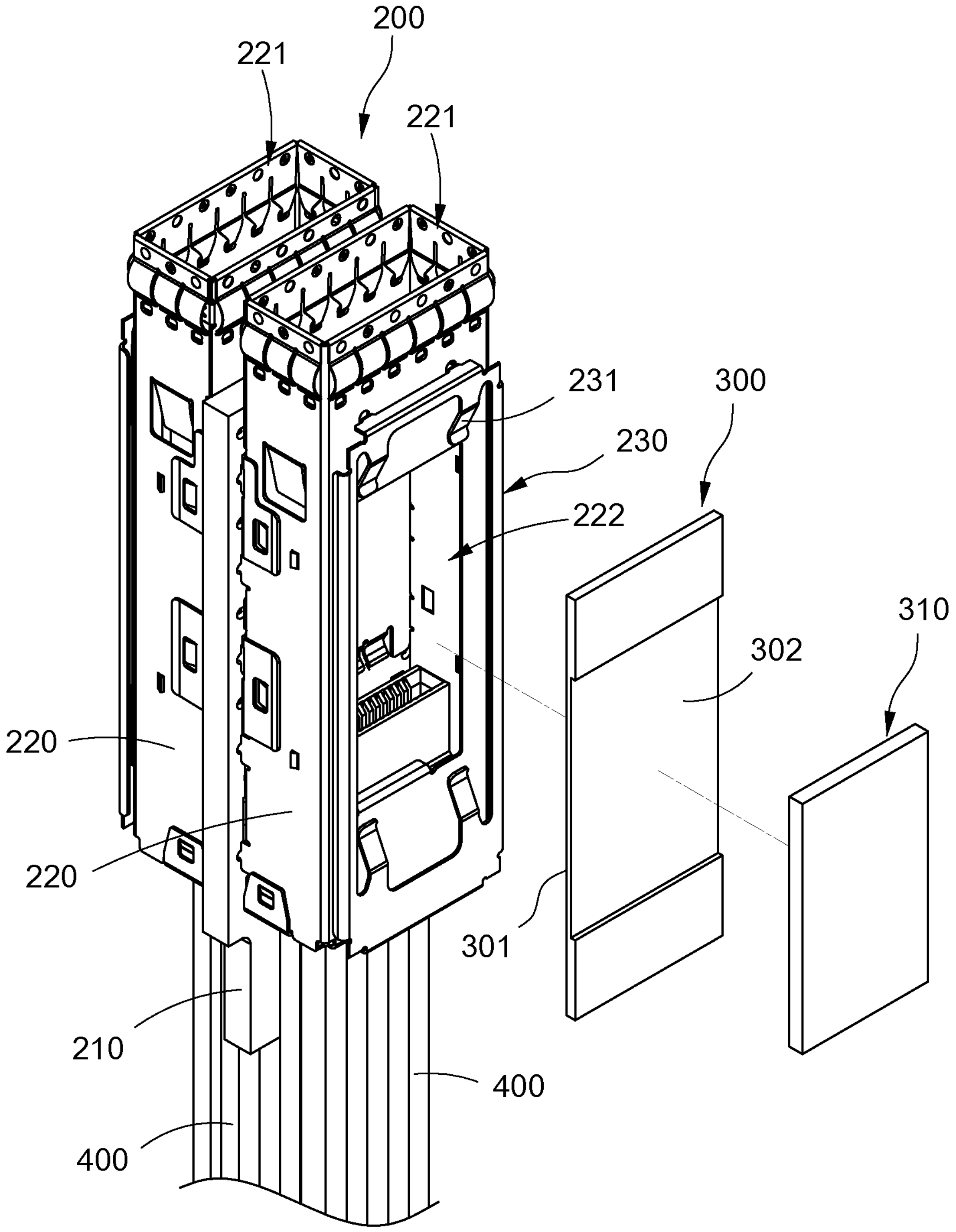
FIG. 7 is a schematic view of a heat conduction plate in the waterproof electrical connection device according to one embodiment of the present disclosure.

Referring to FIGS. 2, 3, and 4, in the present embodiment, the waterproof electrical connection device of the present disclosure includes a waterproof casing 100, a socket assembly 200, a heat conduction plate 300, at least one wire element 400, and a waterproof plug 500.

Referring to FIGS. 1, 2, 3, and 4, in the present embodiment, the waterproof casing 100 is elongated and may be inserted into the installation hole 23 of the partition board 20. One end of the waterproof casing 100 has an opening 101 and is in an open manner. The opening 101 is located at the dry side 21 of the partition board 20, and this end of the waterproof casing 100 is threadedly connected to a press ring 130 to fasten the waterproof casing 100 to the partition board 20. Another end of the waterproof casing 100 includes a wiring port 102. The wiring port 102 is located at the wet side 22 of the partition board 20, and an end cover 140 is disposed on the wiring port 102 to close the wiring port 102. Therefore, the interior of the waterproof casing 100 communicates with the dry side 21 of the partition board 20 and is isolated from the wet side 22 of the partition board 20. An annular step surface 120 protrudes from an inner side of the waterproof casing 100, and the annular step surface 120 is disposed facing the wiring port 102. A plurality of heat dissipation fins 110 are disposed on an outer surface of the waterproof casing 100, so the heat dissipation fins 110 are exposed from the wet side 22 of the partition board 20.

The socket assembly 200 is accommodated in the waterproof casing 100. The socket assembly 200 includes a circuit board 210 and at least one metal housing 220, and the metal housing 220 is attached to the circuit board 210. In this embodiment, the socket assembly 200 includes two identical metal housings 220, and the two metal housings 220 are symmetrically attached to two sides of the circuit board 210 respectively. In the following descriptions, only one of the metal housings 220 is described as an example to illustrate a structure of the metal housing 220. In this embodiment, the metal housing 220 is in an elongated shape. One end of the metal housing 220 includes an insertion hole 221, and a lateral hole 222 is defined in a lateral side of the metal housing 220. The metal housing 220 is inserted into the waterproof casing 100 and passes through the opening 101 of the waterproof casing 100, so that the insertion hole 221 is aligned with the opening 101 for the plug 10 to be plugged in the socket assembly 200 from the dry side 21 of the partition board 20.

Referring to FIGS. 3, 4, 7, and 8, a heat conduction structure of the waterproof electrical connection device of the present disclosure is described in detail as follows:

The heat conduction plate 300 is movably attached to an outer side of the metal housing 220. One side of the heat conduction plate 300 protrudes to an inner side of the metal housing 220 through the lateral hole 222. A soft heat conduction element 310 is attached to another side of the heat conduction plate 300. In the present embodiment, the soft heat conduction element 310 is a thermal paste or a thermal pad made of an adhesive mixed with metal powder. Specifically, the heat conduction plate 300 includes a protruding platform 301, and the protruding platform 301 protrudes to the inner side of the metal housing 220 through the lateral hole 222. The heat conduction plate 300 is provided with a recess 302 arranged on side opposite to the protruding platform 301. The soft heat conduction element 310 is accommodated in the recess 302. The soft heat conduction element 310 is spaced part from the inner side of the waterproof casing 100, so that the socket assembly 200 may be inserted into the waterproof casing 100 during assembly. The heat conduction plate 300 is provided with a guiding slope 303. The guiding slope 303 is arranged on one side of the platform 301 and protrudes into the metal housing 220, and the guiding slope 303 is arranged toward the insertion hole 221.

Figure 8:
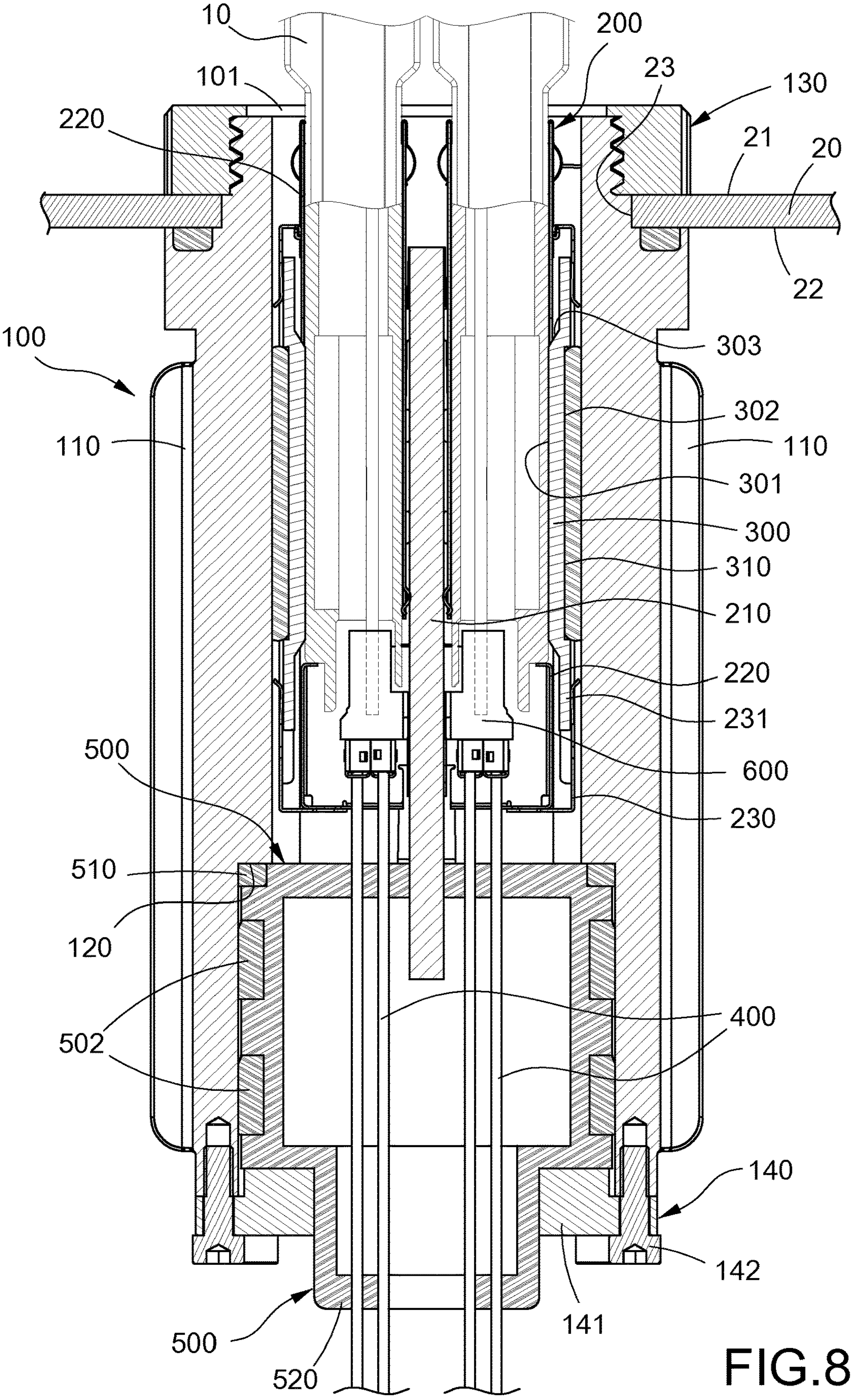
FIG. 8 is a schematic view illustrating a use state of the heat conduction plate in the waterproof electrical connection device according to one embodiment of the present disclosure.

Referring to FIG. 8, when the plug 10 is inserted into the metal housing 220, the plug 10 pushes the heat conduction plate 300 by the protruding platform 301. The plug 10 presses against the protruding platform 301 to be thermally connected with the heat conduction plate 300, and the guiding slope 303 allows the plug 10 to push the protruding platform 301 easily. The heat conduction plate 300 is pushed out of the metal housing 220, so that the soft heat conduction element 310 is compressed by the heat conduction plate 300 and the waterproof casing 100, and thereby the heat conduction plate 300 being thermally connected to the waterproof casing 100. In some embodiments, the soft heat conduction element 310 is arranged corresponding to positions of the heat dissipation fins 110, and when the plug 10 is inserted into the metal housing 220, the heat conduction plate 300 is thermally connected to the heat dissipation fins 110.

The metal housing 220 is provided with an elastic member 230, and the elastic member 230 is connected to the heat conduction plate 300. When the plug 10 is removed, the elastic member 230 may push the heat conduction plate 300 to restore. Specifically, the elastic member 230 is a metal frame 141 attached to the outer side of the metal housing 220. An elastic arm 231 extends from the elastic member 230, and the elastic arm 231 presses against the heat conduction plate 300 to push the heat conduction plate 300 into the metal housing 220.

Referring to FIGS. 3, 4, 5, and 6, the electrical connection structure of the waterproof electrical connection device of the present disclosure is detailed as follows:

The socket assembly 200 further includes at least one connector 600. The connector 600 is disposed inside the metal housing 220. In the present embodiment, two connectors 600 are respectively disposed in the two metal housings 220. The number of the wire elements 400 is corresponding to the number of the connectors 600. One end of each wire element 400 is connected to the corresponding connector 600 in the aforementioned socket assembly 200 for data exchange with the outside. Each wire element 400 is electrically connected to the circuit board 210. Therefore, the circuit board 210 may use the public version, and the required connectors 600 are arranged on the circuit board 210, thereby saving materials and production costs.

Referring to FIGS. 3, 4, 5, and 6, the waterproof structure of the waterproof electrical connection device of the present disclosure is described in detail as follows:

The waterproof plug 500 covers one section of the wire element 400. Specifically, the waterproof plug 500 covers a connection portion between the wire element 400 and the circuit board 210. The waterproof plug 500 is disposed in the wiring port 102 to close the wiring port 102. The waterproof plug 500 has an inner end 510 and an outer end 520 opposite to the inner end 510. The inner end 510 of the waterproof plug 500 is disposed toward the socket assembly 200 and is provided with a longitudinal ring rib 501. The end cover 140 is fastened to the waterproof casing 100, by using a screw 142, along a longitudinal direction of the waterproof plug 500 and presses against the outer end 520, so that the longitudinal ring rib 501 presses against the annular step surface 120 to achieve a sealing effect. An outer surface of the waterproof plug 500 is provided with a horizontal ring rib 502, and the horizontal ring rib 502 abuts against an inner surface of the waterproof casing 100 to achieve a sealing effect.

Specifically, the above-mentioned end cover 140 includes a plurality of frame bodies 141, and the frame bodies 141 are connected to each other to form a through hole 103 for insertion of the waterproof plug 500. Each frame body 141 is fastened to the waterproof casing 100, by using a screw 142, along a longitudinal direction of the waterproof plug 500. Therefore, when the frame bodies 141 are assembled together, an inner edge of the through hole 103 presses inward to tightly abut against an outer surface of the waterproof plug 500 to achieve sealing effect.

Referring to FIG. 8, a connection structure of the connector 600 and the wire element 400 is described as follows. Only one of the connectors 600 and its corresponding wire element 400 is described below as an example for illustration.

Figure 9:
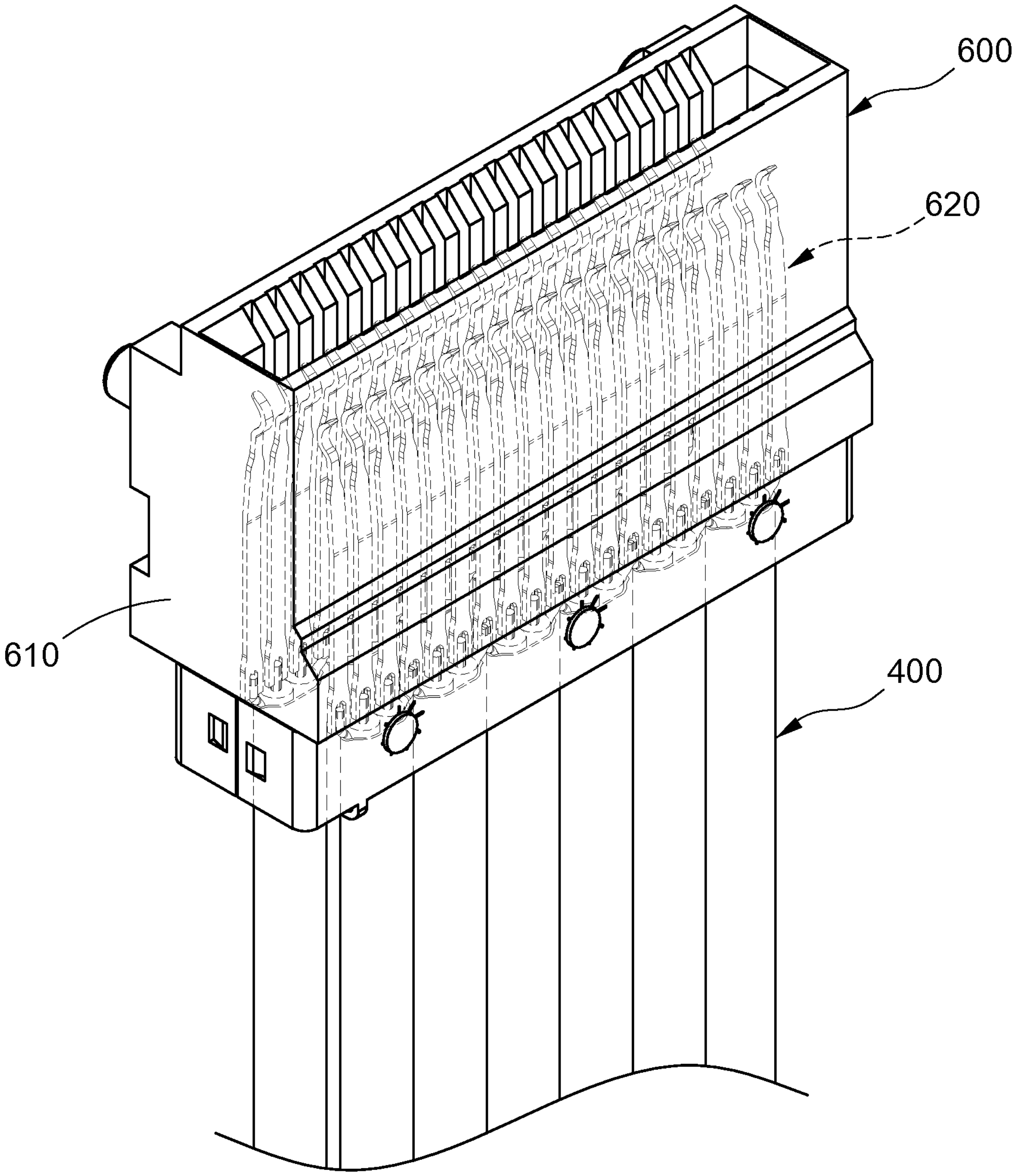
FIGS. 9, 10, and 11 are schematic views illustrating a soldering structure of a soldering pin and a welding end in the waterproof electrical connection device according to one embodiment of the present disclosure.

Referring to FIG. 9, the connector 600 includes an insulating base 610 and a plurality of terminals 620. The insulating base 610 is an insulating block made of plastic. The terminals 620 are embedded in the insulating base 610. Specifically, the insulating base 610 is formed to cover the terminals 620 by injection molding process.

Figure 10:
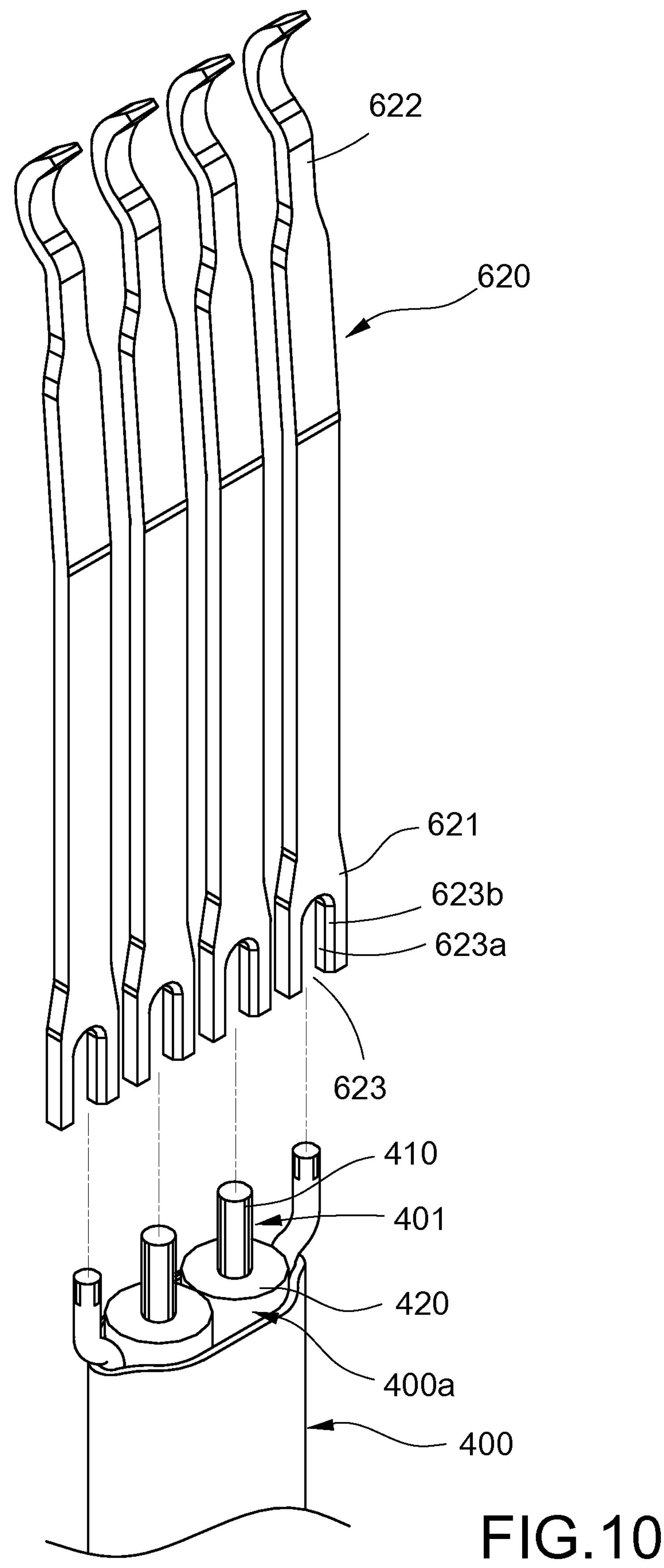

Referring to FIGS. 9 and 10, the wire element 400 includes a plurality of wires 400*a* corresponding to the terminals 620. Each terminal 620 is an elongated metal sheet. Each terminal 620 has a soldering pin 621 and at least one overlapping end 622 disposed opposite to the soldering pin 621. The soldering pin 621 and the overlapping end 622 are disposed protrusively from two ends of the insulating base 610 respectively. The soldering pins 621 are arranged in a row, and the overlapping ends 622 are also arranged in a row. In the present embodiment, each soldering pin 621 is provided with a soldering groove 623. The soldering groove 623 is recessed from one side of the soldering pin 621 and extends to penetrate the other side of the soldering pin 621. Specifically, the soldering groove 623 of each soldering pin 621 includes a notch 623*a* and a slope 623*b*. The notch 623*a* is located at a bottom of the soldering groove 623 and penetrates through the soldering pin 621. The slope 623*b* extends outward from an edge of the notch 623*a* to a surface on an opposite side of the soldering groove 623. In the present embodiment, each slope 623*b* is a flat surface. In each soldering pin 621, the soldering groove 623 is formed by pressing, wherein the notch 623*a* is firstly formed and then the slope 623*b* is formed. During a pressing step to form the slope 623*b*, a metal material is pressed into the notch 623*a* to prevent the metal material from being extruded outward and causing a deformed shape of the terminal 620, thereby ensuring a predetermined size of the terminal 620.

Figure 11:
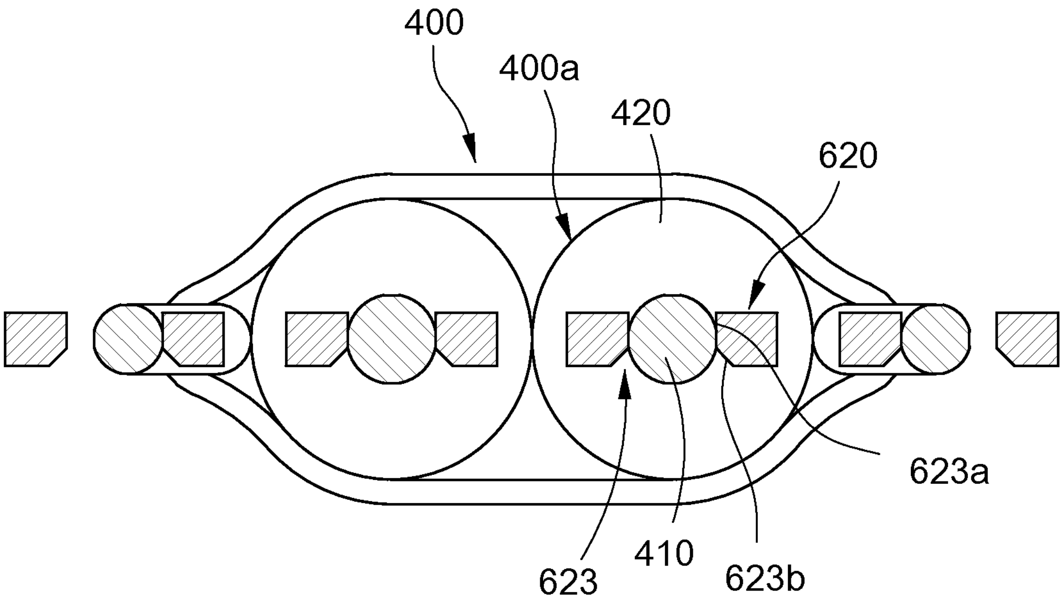

Referring to FIG. 11, each wire 400*a* is soldered to corresponding one of the terminals 620. Each wire 400*a* includes a soldering end 401. Each wire 400*a* includes a wire core 410 and an insulating layer 420 covering the wire core 410. In each wire 400*a*, the wire core 410 is exposed from the soldering end 401 and soldered to the corresponding terminal 620. Each wire 400*a* is soldered to the corresponding soldering pin 621 by the soldering end 401 of each wire 400*a*. Each soldering end 401 is accommodated in corresponding one of the soldering grooves 623. Each wire 400*a* is arranged along a longitudinal direction of corresponding one of the soldering pins 621. Specifically, a diameter of each soldering end 401 is less than a width of the corresponding notch 623*a*, and each soldering end 401 is accommodated in corresponding one of the notches 623*a*.

Figure 12:
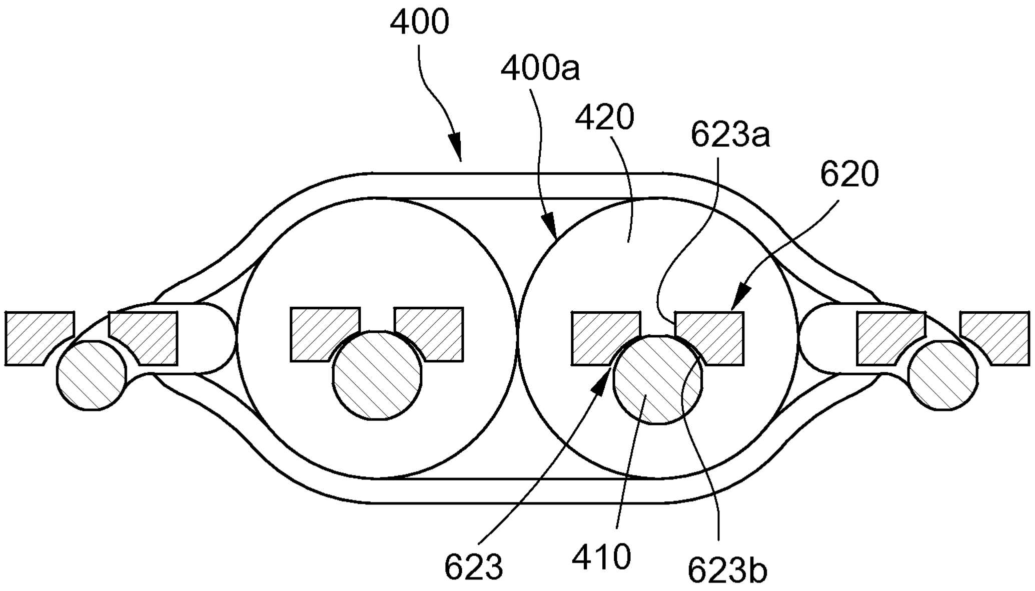
FIG. 12 is another schematic view of the soldering structure of the soldering pin and the soldering end in the waterproof electrical connection device according to one embodiment of the present disclosure.

Please refer to FIG. 12 showing the soldering structure of the soldering pin 621 and the soldering end 401 according to another embodiment. Each slope 623*b* has a concave curved surface. Each welding end 401 is accommodated in the corresponding notch 623*a* and is supported on the corresponding slope 623*b*. In the present embodiment, a diameter of each soldering end 401 is greater than a width of the corresponding notch 623*a* so as not to fall into the notch 623*a* of the soldering groove 623. The soldering groove 623 is formed by pressing, wherein the notch 623*a* is firstly formed, and then the slope 623*b* is formed. During a pressing step to form the slope 623*b*, a metal material is pressed into the notch 623*a* to prevent the metal material from being extruded outward and causing a deformed shape of the terminal 620, thus ensuring that the terminal 620 has a predetermined size.

In the waterproof electrical connection device of the present disclosure, the soldering pin 621 of each terminal 620 is provided with a concave soldering groove 623 for accommodating the welding end 401 of the corresponding wire 400*a*. The soldering end 401 of the wire 400*a* is embedded in the soldering pin 621 of the corresponding terminal 620 to reduce a thickness of the soldering structure of the soldering pin 621 and the soldering end 401. Compared with a soldering structure having the wire 400*a* directly soldered to a surface of the terminal 620, the soldering structure in which the wire 400*a* is embedded in the terminal 620 has a reduced thickness and lower coupling capacitance. Therefore, the structure of the waterproof electrical connection device of the present disclosure effectively suppresses crosstalk interference during high-frequency signal transmission.

What is claimed is:

1. A waterproof electrical connection device, comprising:

a waterproof casing, comprising a wiring port, wherein an annular step surface facing the wiring port is disposed on an inner surface of the waterproof casing, and the wiring port is covered by an end cove;

a socket assembly, accommodated in the waterproof casing and comprising a circuit board and a connector disposed on the circuit board;

a wire element, connected to the connector and passing through the waterproof casing via the wiring port; and a waterproof plug, covering a section of the wire element, wherein the waterproof plug is disposed in the wiring port to seal the wiring port, the waterproof plug comprises an inner end and an outer end opposite to the inner end, the inner end is disposed facing the socket assembly, a longitudinal ring rib is disposed on the inner end, and the waterproof plug covers a connection portion between the wire element and the circuit board, wherein the end cover is fastened to the waterproof casing along a longitudinal direction of the waterproof plug to press against the outer end to make the longitudinal ring rib press against the annular step surface.

2. The waterproof electrical connection device of claim 1, wherein the end cover comprises a plurality of frame bodies, the frame bodies are connected to each other to define a through hole, and when the frame bodies are assembled, an inner edge of the through hole presses against an outer surface of the waterproof plug.

3. The waterproof electrical connection device of claim 2, wherein each of the frame bodies is fastened to the waterproof casing along the longitudinal direction of the waterproof plug.

4. The waterproof electrical connection device of claim 1, wherein a horizontal ring rib is disposed on an outer surface of the waterproof plug, and the horizontal ring rib abuts against the inner surface of the waterproof casing.

5. The waterproof electrical connection device of claim 1, wherein the connector comprises a plurality of terminals, the wire element comprises a plurality of wires, each of the wires comprises a soldering end, a wire core and an insulating layer covering the wire core, and in each of the wires, the wire core is exposed from the soldering end and soldered to one of the terminals correspondingly.

6. The waterproof electrical connection device of claim 5, wherein each of the terminals comprises a soldering groove, the soldering groove comprises a notch and a slope, the slope is a concave curved surface, and the soldering end is accommodated in the notch and supported by the slope.

7. The waterproof electrical connection device of claim 6, wherein a diameter of the soldering end is greater than a width of the notch.

8. The waterproof electrical connection device of claim 5, wherein each of the terminals comprises a soldering groove, the soldering groove comprises a notch and a slope, the slope is a flat surface, and the soldering end is accommodated in the notch.

9. The waterproof electrical connection device of claim 8, wherein a diameter of the soldering end is less than a width of the notch.

10. The waterproof electrical connection device of claim 5, wherein each of the terminals is an elongated metal sheet.

* * * * *